United States Patent
Tateishi

(10) Patent No.: US 6,259,663 B1
(45) Date of Patent: Jul. 10, 2001

(54) SIGNAL COMPENSATING APPARATUS, INFORMATION REPRODUCING APPARATUS AND INFORMATION RECORDING APPARATUS

(75) Inventor: Kiyoshi Tateishi, Tsurugashima (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/201,668

(22) Filed: Dec. 1, 1998

(30) Foreign Application Priority Data

Dec. 1, 1997 (JP) .................................... 9-330141

(51) Int. Cl.$^7$ ....................................................... G11B 7/00

(52) U.S. Cl. .................................. 369/53.12; 369/44.34; 369/44.32; 369/124.01

(58) Field of Search ................................ 369/54, 53, 47, 369/48, 59, 58, 44.27, 44.28, 44.29, 44.32, 44.34, 53.1, 53.11, 53.12, 53.32, 53.42, 53.44, 124.01, 124.15

(56) References Cited

U.S. PATENT DOCUMENTS 4,785,442 * 11/1988 Ohtake et al. .................... 369/44.32

* cited by examiner

Primary Examiner—Muhammad Edun
(74) Attorney, Agent, or Firm—Young & Thompson

(57) ABSTRACT

A signal compensating apparatus is an apparatus for compensating a control signal which is generated on the basis of a light beam reflected by an optical recording medium and which includes information with respect to a relationship between a spot of the light beam and a track of the optical recording medium. The signal compensating apparatus has: a detecting device for detecting a damaged part of the control signal, which is caused by a defect of the optical recording medium or an obstruction existing on an optical path of the light beam or on the optical recording medium; a replacing signal generating device for generating a replacing signal whose level gradually varies so as to connect a level of a first normal part of the control signal immediately before the damaged part with a level of a second normal part of the control signal immediately after the damage part; and a replacing device for replacing the damaged part by the replacing signal.

16 Claims, 3 Drawing Sheets

SIGNAL COMPENSATING APPARATUS, INFORMATION REPRODUCING APPARATUS AND INFORMATION RECORDING APPARATUS

BACKGROUND OF THE INVENTION

1. Field of the Invention

The present invention relates generally to a signal compensating apparatus which is used for an information reproducing apparatus that reproduces information recorded on a recording medium by using a light beam or an information recording apparatus that records information onto a recording medium, and specifically to a signal compensating apparatus which can compensate a reproduction signal damaged by a defect such as a crack on the recording medium and the like.

2. Description of the Related Art

Generally, the information reproducing apparatus reproduces the information recorded on the recording medium such as an optical disk, while carrying out a focus servo control and tracking servo control. The information reproducing apparatus carries out the focus servo control by using a light beam reflected by the information record surface of the optical disk in order to focus the light beam on the information record surface. Furthermore, the information reproducing apparatus carries out the tracking servo control by using the light beam reflected by the information record surface in such a way that the light spot of the light beam is located on an information track(s) formed on the optical disk.

In the focus servo control, the information reproducing apparatus generates a focus error signal by using the reflected light beam. This focus error signal includes information with respect to a deviation of the focal point from the information record surface. The information reproducing apparatus detects the deviation of the focal point on the basis of the focus error signal, and carries out the focus servo control so as to eliminate the deviation.

In the tracking servo control, the information reproducing apparatus generates a tracking error signal by using the reflected light beam. This tracking error signal includes information with respect to a difference between the light spot position and the information track position on the information record surface. The information reproducing apparatus detects this difference on the basis of the tracking error signal, and carries out the tracking servo control so as to eliminate this difference.

If there is a defect or obstruction, such as various defect of the optical disk (e.g. a damage of the information pit), cracks, dusts existing on the way of the optical path of the light beam or on the optical disk, etc., it becomes difficult to carry out the focus or tracking servo control correctly. Such a defect or obstruction (Hereinafter, it is referred to as a "defect".) has influence on the reflected light beam. As a result, a reproduction signal is partly damaged. More concretely, in the damaged part of the reproduction signal, the level of the reproduction signal decreases below the lower limit of the normal level range of the reproduction signal. This decrease of the level of the reproduction signal leads to a distortion of the wave form of the error signal (i.e. focus error signal or tracking error signal). As a result, accuracy of the servo control decreases.

In the conventional information reproducing apparatus, in order to solve this problem, the distortion of the error signal caused by the defect is detected, and the voltage level of a normal part of the error signal ahead of the distortion part is held by a sample-hold circuit or the like. That is, the distortion part is replaced by the constant voltage.

Furthermore, when reproducing the information recorded on the optical disk, the information reproducing apparatus operates on the basis of a standard reproduction clock signal. The standard reproduction clock signal is generated on the basis of information obtained from the reflected light beam. In this case, if there is a defect, the standard reproduction clock signal is damaged by this defect. More concretely, the standard reproduction clock signal is generated by the PLL (Phase Locked Loop) circuit. If there is a defect, the wave form of a control voltage generated by a VCO (voltage Control Oscillator) of a PLL is distorted due to this defect.

In order to eliminate the influence of the defect on the control voltage, the aforementioned method, namely, the method where the distortion part is replaced by the constant voltage is used.

However, the aforementioned method causes another problem. In the aforementioned information reproduction apparatus, when the distortion part has been eliminated by replacing the distortion part by the constant voltage, the constant voltage is replaced again by the original signal, i.e. the normal error signal. At this time, there is a possibility that a large difference exists between the constant voltage and the voltage of the error signal. This is because the actual error signal is varies while the constant voltage is being output.

If the large difference exists between the constant voltage and the voltage of the error signal, the level of the error signal, as a result, sharply varies. If such an error signal is fed into a focus actuator or a tracking actuator, which is used for the focus servo control or the tracking servo control, the actuator is suddenly driven. This causes the actuator to be unstable. As a result, accuracy of the servo control decreases.

This problem is serious from the viewpoint of the improvement of a record density in recent years (a reduction of an allowable value in a control deviation resulting from a contraction of an interval of the information track and a miniaturization of the information pit).

In the case of generating the standard reproduction clock signal, the similar problem occurs. If the large difference exists between the constant voltage and the actual control voltage generated by the VCO of the PLL, the actual control voltage, as a result, sharply varies, and therefore, serious errors occurs in a process of reproducing the information recorded on the optical disk. Such serious errors cannot be corrected by using the error correction technique. This results in a problem that it may be impossible to reproduce the information correctly.

SUMMARY OF THE INVENTION

It is therefore an object of the present invention to provide a signal compensating apparatus, an information reproducing apparatus and an information recording apparatus each of which can eliminate the influence of the defect without a decrease in accuracy of the servo control or generation of the standard reproduction or recording clock signal.

The above mentioned object can be achieved by a signal compensating apparatus in accordance with the present invention. The signal compensating apparatus is an apparatus for compensating a control signal which is generated on the basis of a light beam reflected by an optical recording medium. The signal compensating apparatus has: a detecting device for detecting a damaged part of the control signal, which is caused by a defect of the optical recording medium or an obstruction existing on an optical path of the light beam or on the optical recording medium; a replacing signal generating device for generating a replacing signal whose level gradually varies so as to connect the level of a first normal part of the control signal immediately before the damaged part with the level of a second normal part of the control signal immediately after the damage part; and a replacing device for replacing the damaged part by the replacing signal.

In this signal compensating apparatus, the damaged part of the control signal can be eliminated by replacing the damaged part by the replacing signal. The replacing signal is generated by the replacing signal generating device. The level of the replacing signal gradually varies so as to connect the level of the normal part of the control signal immediately before the damaged part with the level of the normal part of the control signal immediately after the damage part. Therefore, the normal part of the control signal immediately before the damaged part is gradually connected with the normal part of the control signal immediately after the damage part. As the damaged part of the control signal can be eliminated and the control signal can be gradually connected, if this control signal is used for a servo control or a generation of a standard reproduction or recording clock signal, it is possible to prevent a decrease of accuracy of the servo control or generation of the standard reproduction or recording clock signal.

In the aforementioned signal compensating apparatus, the replacing signal generating device may include a recognizing device for recognizing the level of the first normal part and the level of the second normal part with respect to the control signal generated before the optical recording medium makes one rotation, more than one rotation, or one and more than one rotation. Therefore, it is possible to generate the replacing signal accurately, and connect accurately between the normal parts of the control signal immediately and after the damaged part.

In the aforementioned signal compensating apparatus, the replacing signal generating device generates the replacing signal having a wave form in the shape of stairs. Therefore, it is possible to connect between the normal parts of the control signal immediately and after the damaged part by using gradual wave form.

The above mentioned object can be achieved by an information reproducing apparatus in accordance with the present invention. The information reproducing apparatus is an apparatus for reproducing information recorded on an optical recording medium by emitting a light beam onto the optical recording medium. The information reproducing apparatus has: a reproduction signal generating device for generating a reproduction signal on the basis of the light beam reflected by the optical recording medium; a reproducing device for reproducing the information recorded on the optical recording medium on the basis of the reproduction signal; a control signal generating device for generating a control signal on the basis of the light beam reflected by the optical recording medium; a detecting device for detecting a damaged part of the control signal, which is caused by a defect of the optical recording medium or an obstruction existing on an optical path of the light beam or on the optical recording medium; a replacing signal generating device for generating a replacing signal whose level gradually varies so as to connect the level of a first normal part of the control signal immediately before the damaged part with the level of a second normal part of the control signal immediately after the damage part; and a replacing device for replacing the damaged part by the replacing signal. In addition, the reproduction signal is a signal corresponding to the information recorded on the optical recording medium.

In this information reproducing apparatus, the control signal is used to control the reproduction of the information recorded on the optical recording medium. For example, the control signal may be used as a focus error signal which includes information with respect to a relationship between a focal point of the light beam and a track of the optical recording medium. Furthermore, the control signal may be also used as a tracking error signal which includes information with respect to a relationship between a spot position of the light beam and a track position of the optical recording medium. Moreover, the control signal may be also used as a standard reproduction clock signal which is used as a standard clock for reproducing the information recorded on the optical recording medium.

If such a control signal is damaged, the damaged part of the control signal can be eliminated by replacing the damaged part by the replacing signal. The replacing signal is generated by the replacing signal generating device. The level of the replacing signal gradually varies so as to connect the level of the normal part of the control signal immediately before the damaged part with the level of the normal part of the control signal immediately after the damage part. Therefore, the normal part of the control signal immediately before the damaged part is gradually connected with the normal part of the control signal immediately after the damage part. As the damaged part of the control signal can be eliminated and the control signal can be gradually connected, if this control signal is used for the servo control or a generation of a standard reproduction clock signal, it is possible to prevent a decrease of accuracy of the servo control or generation of the standard reproduction clock signal. Consequently, the information recorded on the optical recording medium can be correctly reproduced.

In the information reproducing apparatus, the detecting device may recognize the damaged part by detecting a decrease of the level of the reproduction signal. Alternatively, the detecting device may recognize the damaged part by detecting a distortion of the wave form of the control signal. In each case, the damaged part can be accurately recognized.

The above mentioned object can be achieved by an information recording apparatus in accordance with the present invention. The information recording apparatus is an apparatus for recording information onto an optical recording medium by emitting a light beam onto the optical recording medium. The information recording apparatus has: a recording device for emitting the light beam onto the optical recording medium, while modulating the light beam according to the information to be recorded onto the optical recording medium; a control signal generating device for generating a control signal on the basis of the light beam reflected by the optical recording medium; a detecting device for detecting a damaged part of the control signal, which is caused by a defect of the optical recording medium or an obstruction existing on an optical path of the light beam or on the optical recording medium; a replacing signal generating device for generating a replacing signal whose level gradually varies so as to connect a level of a first normal part of the control signal immediately before the damaged part with a level of a second normal part of the control signal immediately after the damage part; and a replacing device for replacing the damaged part by the replacing signal.

In this information recording apparatus, the control signal is used to control a recording of the information onto the optical recording medium. If the control signal is damaged, the damaged part of the control signal can be eliminated by replacing the damaged part by the replacing signal. The replacing signal is generated by the replacing signal generating device. The level of the replacing signal gradually varies so as to connect the level of the normal part of the control signal immediately before the damaged part with the level of the normal part of the control signal immediately after the damage part. Therefore, the normal part of the control signal immediately before the damaged part is gradually connected with the normal part of the control signal immediately after the damage part. As the damaged part of the control signal can be eliminated and the control signal can be gradually connected, if this control signal is used for a servo control or a generation of a standard recording clock signal, it is possible to prevent a decrease of accuracy of the servo control or generation of the standard recording clock signal. Consequently, the information can be correctly recorded onto the optical recording medium.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now described. In the description set forth hereinafter, the present invention is adapted to an information reproducing apparatus having a focus servo control mechanism and a PLL circuit for generating a standard reproduction clock signal.

Figure 1:
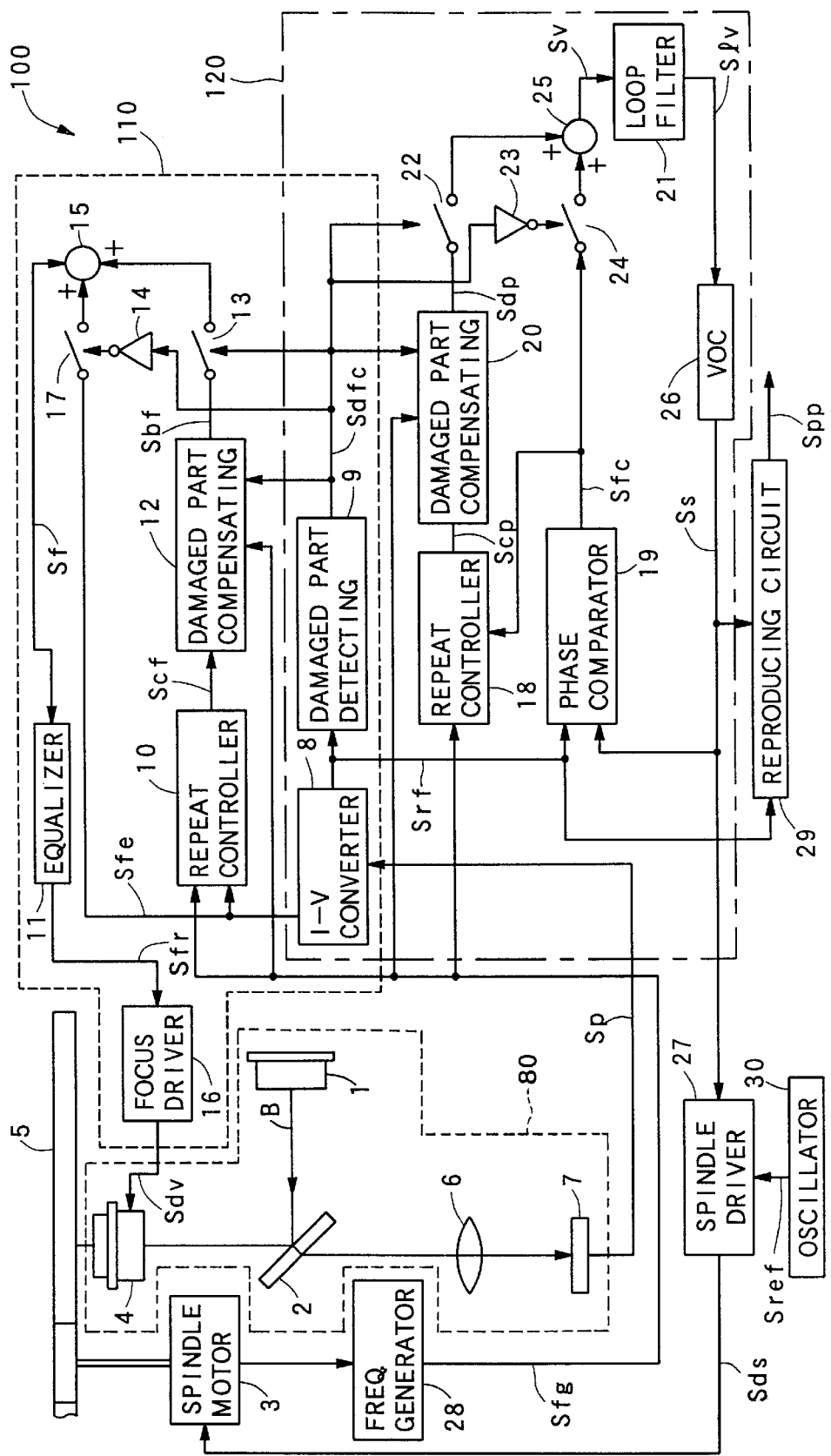
FIG. 1 is a block diagram showing an information reproducing apparatus of an embodiment of the present invention.

At first, a configuration of the information reproducing apparatus of the embodiment of the present invention will be explained with reference to FIGS. 1 and 2. FIG. 1 shows only members with regard to the focus servo mechanism and the PLL circuit in the information reproducing apparatus. In addition to these members, the actual information reproducing apparatus has a tracking servo control mechanism to control the spot position of a light beam, but this mechanism is omitted for the sake of clarity of explanation.

As shown in FIG. 1, an information reproducing apparatus 100 of the embodiment of the present invention is provided with a laser diode 1, a polarization beam splitter 2, a spindle motor 3, an objective lens 4, an optical disk 5, a collective lens 6, a detector 7, a spindle driver 27, a frequency generator 28, a reproducing circuit 29, an oscillator 30, a focus servo circuit 110 and a PLL circuit 120.

The laser diode 1, the polarization beam splitter 2, the objective lens 4, the collective lens 6 and the detector 7 are mounted on a pickup 80.

The focus servo circuit 110 has an I-V (Current-Voltage) converter 8, a damaged part detecting device 9, a repeat controller 10, an equalizer 11, a damaged part compensating device 12, switches 13 and 17, an inverter 14, an adder 15 and a focus driver 16.

The PLL circuit 120 has the I-V converter 8, the damaged part detecting device 9, a repeat controller 18, a phase comparator 19, a damaged part compensating device 20, a loop filter 21, switches 22 and 24, an inverter 23, an adder 25 and a VCO 26.

Configurations of the repeat controllers 10 and 18 will be described with reference to FIG. 2. The repeat controllers 10 and 18 each have the same configuration basically. Thus, the configuration of the repeat controller 10 is representatively described in FIG. 2.

Figure 2:
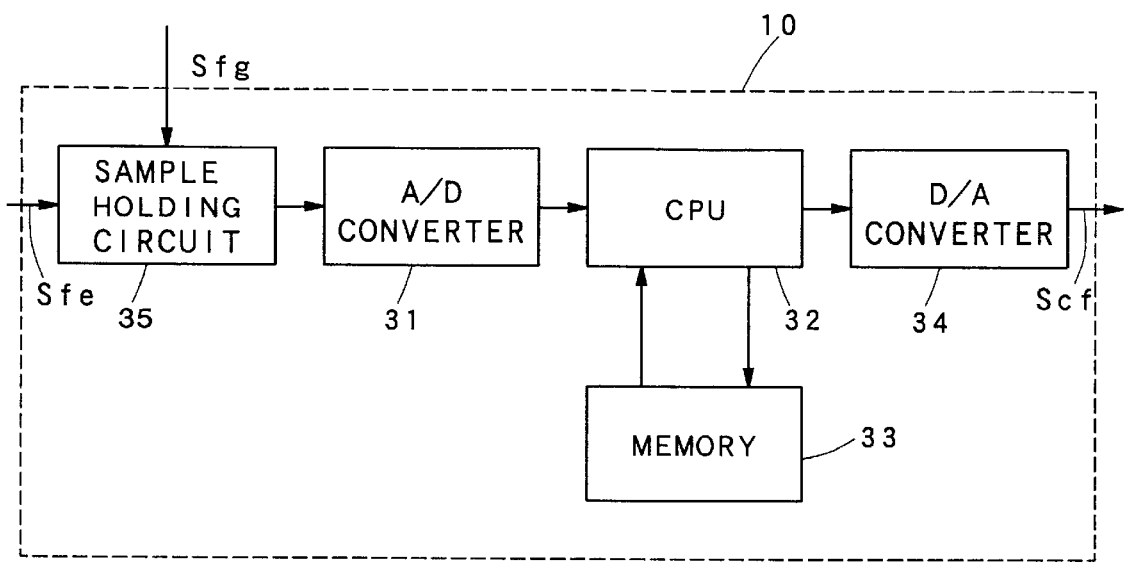
FIG. 2 is a block diagram showing a repeat controller of the information reproducing apparatus.

As shown in FIG. 2, the repeat controller 10 has a sample holding circuit 35, an A/D converter 31, a CPU 32, a memory 33 and a D/A converter 34.

An operation of the information reproducing apparatus 100 will be described with reference to FIG. 1.

The laser diode 1 generates a light beam B for information reproduction, and then emits it to the polarization beam splitter 2.

The polarization beam splitter 2 reflects the light beam B, and sends reflected light beam B to the objective lens 4.

The objective lens 4 emits the light beam B onto an information track of the optical disk 5. Information is recorded on the information track as information pits. The objective lens 4 is moved by an actuator connected with the objective lens 4 (which is not depicted) in the perpendicular direction of the surface of the optical disk 5 (i.e. focus servo control direction). Therefore, the focal point of the light beam B (i.e. the position of the light spot in the focus servo control direction) is adjusted in such way that the light beam B is focused on the information track. As described later, the actuator is driven according to a driving signal Sdv supplied from the focus driver 16.

Moreover, at this time, the optical disk 5 is being rotated by the spindle motor 3 at a predetermined rotational frequency based on a spindle control signal Sds.

The light beam B reflected by the information track is modulated in intensity in accordance with the information (i.e pits) recorded on the optical disk 5, and its polarization surface is rotated. This light beam B passes through the objective lens 4 and the polarization beam splitter 2, and collected on a light receiving surface of the detector 7 by the collective lens 6. At this time, if an astigmatism method is used as a method of generating a focus error signal, the collective lens 6 gives astigmatism to the light beam B.

Other than the astigmatism method, for example, a spot-size method, a knife-edge method or the like may be used as the method of generating the focus error signal.

The detector 7 generates a detection signal Sp corresponding to the intensity of the received light beam B, and then outputs it to the I-V converter 8. Actually, the light receiving surface of the detector 7 is divided into four parts, and four detection signals corresponding to the four parts are generated. The detection signal Sp is generated by using these four detection signals.

On the basis of the detection signal Sp, the focus servo circuit 110 generates the drive signal Sdv, and then outputs it to the focus actuator. The focus actuator is driven according to the drive signal Sdv. Thus, the focus servo control is carried out.

The PLL circuit 120 generates a standard reproduction clock signal Ss serving as the standard clock to reproduce the information recorded on the optical disk 5, on the basis of the detection signal Sp.

The reproducing circuit 29, on the basis of the standard reproduction clock signal Ss, performs a reproducing process. Concretely, the reproducing circuit 29 decodes a reproduction RF signal Srf, and performs an error correction process. The reproduction RF signal corresponds to the information recorded on the optical disk 5, and generated by the I-V converter 8 by using the detection signal Sp. Then, the decoded reproduction RF signal Srf is output as a reproduction signal Spp from the reproducing circuit 29.

On the other hand, the standard reproduction clock signal Ss generated by the PLL circuit 120 is also output to the spindle driver 27. The spindle driver 27 generates the spindle control signal Sds by using the standard reproduction clock signal Ss. More concretely, the spindle driver 27 is coupled to the oscillator 30. The oscillator 30 has a crystal oscillator, and generates a clock signal Sref having a standard frequency of the rotational frequency of the spindle motor 3. The clock signal Sref is fed into the spindle driver 27 from the oscillator 30. If the rotational frequency of the spindle motor 3 is correct, the standard reproduction clock signal Ss coincides with the clock signal Sref. Therefore, the spindle driver 27 generates the spindle control signal Sds in such a way that the standard reproduction clock signal Ss coincides with the clock signal Sref. As a result, the rotational frequency of the spindle motor 3 is correctly adjusted according to the spindle control signal Sds.

Figure 3:
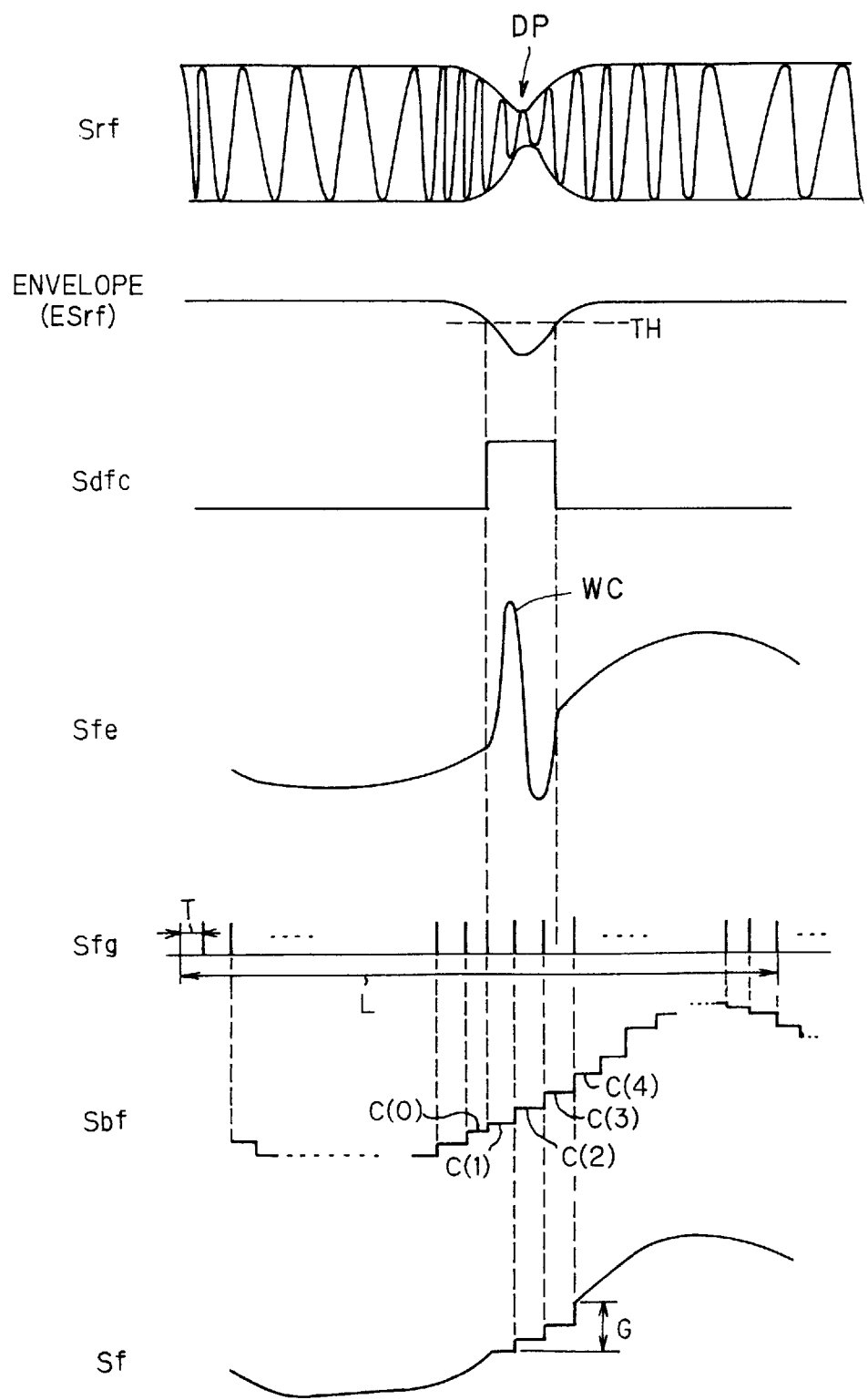
FIG. 3 is a diagram showing a reproduction RF signal Srf, a damage detection signal Sdf, a focus error signal Sfe, a frequency signal Sfg, a focus control signal Sf, etc..

While the above mentioned processes are being carried out, the frequency generator 28 generates a frequency signal Sfg. The frequency signal Sfg is a pulse signal, and synchronized with the rotation of the spindle motor 3 (i.e. rotation of the optical disk 5). In the frequency signal Sfg, the interval of the pulses is constant and the number of pulse per one rotation of the optical disk 5 is constant. For example, the frequency signal Sfg has 36 pulses per one rotation of the optical disk 5. The frequency signal Sfg is shown in FIG. 3. In FIG. 3, "L" represents a time period of one rotation of the optical disk 5. "T" represents the interval of the adjacent pulses of the frequency signal Sfg. The frequency signal Sfg is fed from the frequency generator 28 into the focus servo circuit 110 and the PLL circuit 120.

Operations of the focus servo circuit 110 will be described with reference to FIGS. 1 and 3.

In the focus servo circuit 110, the I-V converter 8 generates the reproduction RF signal Srf corresponding to the information recorded on the optical disk 5, on the basis of the detection signal Sp, and then outputs it to the damaged part detecting device 9. The I-V converter 8 also generates a focus error signal Sfe indicative of a deviation of the focal point of the light beam B from the information track in the focus servo control direction, based on the detection signal Sp, and outputs it to the repeat controller 10 and the switch 17. In order to generate the reproduction RF signal Srf and the focus error signal Sfe, the detector 7 is divided into the four parts as mentioned above. The reproduction Rf signal Srf is generated on the basis of the signal that is the sum of the respective detection signals obtained from the divided light receiving surfaces. On the other hand, the focus error signal Sfe is generated by the astigmatism method, and concretely generated by using the difference between the signals, each of which is the sum of the detection signals obtained from the two light receiving surfaces located opposite to each other among the divided four light receiving surfaces.

If there is a defect, the reproduction RF signal Srf includes a damaged part DP resulting from the defect, as shown in FIG. 3. In order to detect the damaged part DP, the damaged part detecting device 9 firstly generates the envelope Esrf of the reproduction RF signal Srf. As shown in FIG. 3, the voltage of the envelope Esrf decreases at the damaged part DP. The damaged part detecting device 9 secondly generates a damage detection signal Sdfc on the basis of the envelope Esrf. The damage detection signal Sdfc is a signal for identifying the damaged part DP clearly. The voltage of the damage detection signal Sdfc becomes high only while the damaged part DP exists in the reproduction RF signal Srf (Hereinafter, this is referred to as "a damaged period"). The damage detection signal Sdfc is fed into the damaged part compensating device 12, the switch 13 and the inverter 14.

In the damaged period, the focus error signal Sfe is sharply distorted, as shown in FIG. 3. Of course, this is caused by the defect. Hereinafter, this part is referred to as a "wave distortion part WC".

Next, operations of the repeat controller 10 will be described with reference to FIG. 2.

The frequency signal Sfg and the focus error signal Sfe are input to the repeat controller 10. The repeat controller 10 performs a so-called repeat control on the frequency signal Sfg and the focus error signal Sfe, and then generates a repeat signal Scf, and further outputs it to the damaged part compensating device 12.

That is, the repeat controller 10 samples and holds (i.e. performs the so called "sample-hold") the focus error signal Sfe at a timing when each pulse of the frequency signal Sfg is input, and then converts this focus error signal Sfe into a digital signal. Next, the repeat controller 10 accumulates in the memory 33 each digital value of the focus error signal Sfe converted into the digital signal. Accordingly, the focus error signal Sfe input to the repeat controller 10 is sequentially stored in the memory 33 as the digital values. For example, if the frequency signal Sfg has 36 pulses while the optical disk 5 makes the one rotation, the digital value of the focus error signal Sfe for each rotational angle in which the optical disk 5 is divided into 36 equal parts in its circumference direction is accumulated in the memory 33. At the same time, the repeat controller 10 reads-out from the memory 33 the digital value corresponding to the focus error signal Sfe input immediately before the one rotation of the optical disk 5, and then outputs these digital values as the repeat signal Scf. The repeat controller 10 executes the process of reading-out from the memory 33 each time each pulse of the frequency signal Sfg is input.

As a result, the focus error signal Sfe, which was input to the repeat controller 10 just before the one rotation of the optical disk 5 and has been accumulated as digital values in the memory 33, is output from the repeat controller 10 as the repeat signal Scf. Although, the repeat signal Scf is the focus error signal Sfe just before the one rotation of the optical disk 5, this repeat signal Scf includes the wave distortion part WC. This is because the influence of the defect on the focus error signal Sfe does not largely change between at the current position of the optical disk 5 and the position just before the one rotation of the optical disk 5. This reason is that the pickup 80 is only slightly shifted in the radial direction of the optical disk 5 while the optical disk 5 makes one rotation, since the intervals of the adjacent information tracks is very short.

In addition, the memory 33 may store the values of the focus error signal Sfe only before the one rotation, or may store the values of the focus error signals Sfe from a previous timing of one rotation to a timing immediately before that one rotation. Namely, the memory 33 may store the values of the focus error signal Sfe before the one, more than one, or one and more than one rotation. In the latter case, the repeat controller 10 may output as the repeat signal Scf the average of the values of the focus error signals Sfe in the same rotational angle for each rotation.

The damaged part compensating device 12 receives the repeat signal Scf, the frequency signal Sfg and the damage detection signal Sdfc. The damaged part compensating device 12 recognizes the damaged period by detecting the voltage of the damage detection signal Sdfc. The damaged part compensating device 12 directly outputs the repeat signal Scf during the period except the damaged period. On the other hand, during the damaged period, the damaged part compensating device 12 outputs a replacing signal, instead of the repeat signal Scf. As a result, the repeat signal Scf and the replacing signal are alternatively fed into the switch 13 as a damage compensate signal Sbf.

The replacing signal is generated in the damaged part compensating device 12 by the following method. The voltage C(0) of the repeat signal Scf immediately before the damaged period and the voltage C(4) of the repeat signal Scf immediately after the damaged period (that is, focus error signals Sfe that respectively correspond to the timings immediately before and after the damaged period, among the focus error signals Sfe which were detected prior to the one rotation of the optical disk 5 and have been stored in the memory 33) are obtained and recognized. Actually, the digital values of the repeat signal Scf immediately before and after the damaged period are obtained from the memory 33 of the repeat controller 10, and the voltages C(0) and C(4) are calculated on the basis of these digital values. Then, as shown in FIG. 3, the voltage C(0) and C(4) are connected with each other by using voltages C(1), C(2) and C(3). As seen from FIG. 3, the voltages C(1), C(2) and C(3) are gradually varied in such a way that the voltages C(0) and C(4) are connected as smooth as possible. In the embodiment, the line consisting of the voltages C(1), C(2) and C(3) and connecting the voltages C(1) with C(4) is shaped like stairs.

Now, a method of generating the replacing signal is explained in detail. When the damaged period is a length for odd-numbered pulses of the frequency signal Sfg (for example, a length for three pulses as shown in FIG. 3), the replacing signal is generated as follows.

Firstly, the middle voltage C(2) of the voltages C(0) and C(4) is calculated as follows:

$$C(2)=C(0)+\{C(4)-C(0)\}/2. \quad (1)$$

Secondly, the middle voltage C(1) of the voltages C(0) and C(2) is calculated as follows:

$$C(1)=\{C(0)+C(2)\}/2. \quad (2)$$

Thirdly, the middle voltage C(3) of the voltages C(2) and C(4) is calculated as follows:

$$C(3)=\{C(2)+C(4)\}/2. \quad (3)$$

In such a manner, the voltages of the replacing signal are sequentially calculated, and each calculated voltage is output at the timing that each pules of the frequency signal Sfg is input to the damaged part compensating device 12.

On the other hand, when the damaged period is a length for even-numbered pulses in the frequency signal Sfg (for example, a length for four pulses), the replacing signal is generated as follows.

Assuming that the voltage the repeat signal Scf immediately before the damaged period is C(0), and the voltage of the repeat signal Scf immediately after the damaged period is C(5), the first voltage C(1) at a timing for one pulse of the frequency signal Sfg in the lead of the damaged period is firstly calculated as follows:

$$C(1)=C(0). \quad (4)$$

Secondly, the middle voltage C(3) of the voltages C(1) and C(5) is calculated as follows:

$$C(3)=C(1)+\{C(5)-C(1)\}/2. \quad (5)$$

Thirdly, the middle voltage C(2) of the voltages C(1) and C(3) is calculated as follows:

$$C(2)=\{C(1)+C(3)\}/2. \quad (6)$$

Finally, the middle voltage C(4) of the voltages C(3) and C(5) is calculated as follows:

$$C(4)=\{C(3)+C(5)\}/2. \quad (7)$$

In such a manner, the voltages of the replacing signal are sequentially calculated, and each calculated voltage is output at the timing that each pules of the frequency signal Sfg is input to the damaged part compensating device 12.

In the above mentioned operation, the replacing process is executed on the basis of the focus error signal Sfe prior to one rotation. This is based on the fact that there is a strong relation between a focus error at a present rotational angle and a focus error at the same rotational angle prior to the one rotation. In other words, the above mentioned operation uses the fact that the undulation of the information track and the deviation of the surface accuracy of the optical disk 5 are not sharply changed in the period of the one rotation (that is, for one information track).

Next, the damage compensating signal Sbf and focus error signal Sfe are switched by the switches 13, 17, both the signals are added by the adder 15, and then output to the equalizer 11 as the focus control signal Sf.

More concretely, the damaged detection signal Sdfc is supplied to the switch 13 directly. In contrast, the damage detection signal Sdfc is supplied to the switch 17 though the inverter 14. The inverter 14 inverts the polarity of the damaged detection signal Sdfc. Both of the switches 13 and 17 has the same function that it is on when the input signal is "hight". Consequently, the switch 13 is on only when the damage detection signal Sdfc is "high", and the switch 17 is on only when the damage detection signal Sdfc is "low". After all, the focus error signal Sfe is output from the adder 15 during the period except the damaged period, and the damage compensating signal Sbf (i.e. the replacing signal) is output from the adder 15 during the damaged period. As a result, the focus error signal Sfe and the damage compensating signal Sbf are alternatively output from the adder 15, so that the focus error signal Sf is generated, as shown in FIG. 3. Then, the focus error signal Sf is fed into the equalizer 11.

As a result, as shown in FIG. 3, the change of the voltage of the focus control signal Sf during the damaged period is gradual and relatively smooth. The gap G between the voltage of the focus control signal Sf immediately before and after the damaged period is replaced by the smooth and continuous line.

Next, the focus control signal Sf is input to the equalizer 11. The frequency property of the focus control signal Sf is corrected by the equalizer 11. Then, the focus control signal Sf is outputted to the focus driver 16 as a corrected focus control signal Sfr.

The focus driver 16 drives the focus actuator (not shown) fixed to the objective lens 4, on the basis of the corrected focus control signal Sfr, and then generates the drive signal Sdv of carrying out the focus servo control.

Next, operations of the PLL circuit 120 will be described with reference to FIGS. 1 and 3.

In the PLL circuit 120, the I-V converter 8 generates the reproduction RF signal Srf on the basis of the above-input detection signal Sp, and then outputs it to the damaged part detecting device 9, the phase comparator 19 and the reproducing circuit 29. This reproduction RF signal Srf is generated on the basis of the signal which is the sum of the respective detection signals from the divided light receiving surfaces in the detector 7, as mentioned above.

The damaged part detecting device 9 generates the envelope of the reproduction RF signal Srf, as mentioned above, and then generates the damage detection signal Sdfc, and further outputs it to the repeat controller 20, the switch 22 and the inverter 23.

The phase comparator 19 compares the phase of the reproduction RF signal Srf with that of the standard reproduction clock signal Ss supplied from the VCO 26, and then outputs a comparison signal Sfc, which is a phase difference between the respective signals, to the switch 24 and the repeat controller 18. At this time, a part of the wave form of the comparison signal Sfc corresponding to the damaged part of the reproduction RF signal Srf is distorted.

Operations of the repeat controller 18 will be described. Similarly to the repeat controller 10, the repeat controller 18 performs the repeat control on the frequency signal Sfg and the comparison signal Sfc, and then generates the repeat signal Scp, and further outputs it to the damaged part compensating device 20.

That is, the repeat controller 18 accumulates the values of the comparison signal Sfc in the memory at a timing when each pulse of the frequency signal Sfg is input. At the same time, the repeat controller 18 reads-out from the memory the values corresponding to the comparison signal Sfc input just before one rotation of the optical disk 5, and then outputs these values as the repeat signal Scp. The repeat controller 18 executes the process of reading-out from the memory each time each pulse of the frequency signal Sfg is input. Incidentally, the repeat signal Scp corresponding to the damaged period of the reproduction RF signal Srf includes a wave distortion different from those of the repeat signals Scp before and after the damaged period.

The damaged part compensating device 20 receives the repeat signal Scp, the frequency signal Sfg and the damage detection signal Sdfc. The damaged part compensating device 20 recognizes the damaged period by detecting the voltage of the damage detection signal Sdfc. Then, the damaged part compensating device 20 directly outputs the repeat signal Scp during the period except the damaged period. On the other hand, during the damaged period, the damaged part compensating device 20 outputs a replacing signal, instead of the repeat signal Scp. As a result, the repeat signal Scp and the replacing signal are alternatively fed into the switch 22 as a damage compensate signal Sbp.

This replacing signal is generated in the damaged part compensating device 20 by the same method used in the damaged part compensating device 12. Concretely, the voltage of the repeat signal Scp immediately before the damaged period and the voltage of the repeat signal Scp immediately after the damaged period (that is, comparison signals Sfc that respectively correspond to the timings immediately before and after the damaged period, among the comparison signals Sfc which were generated prior to the one rotation of the optical disk 5 and have been stored in the memory of the repeat controller 18) are obtained. Then, the voltages of the repeat signal Scp immediately before and after the damage period are gradually connected with each other.

The damage compensating signal Sbp and comparison signal Sfc are switched by the switches 22 and 24, and both the signals are added by the adder 25, and then output to the loop filter 21 as a voltage signal Sv.

Like the switches 13 and 17, the switch 22 is on only when the damage detection signal Sdfc is "high", and the switch 24 is on only when the damage detection signal Sdfc is "low". (This is because the damage detection signal Sdfc is input to the switch 24 after it is inverted by the inverter 23). After all, as the voltage signal Sv, the comparison signal Sfc is output in the period except the damaged period, and the damage compensating signal Sbp (i.e., the replacing signal) is output in the damaged period.

As a result, the change of the voltage of the voltage signal Sv during the damaged period is gradual and relatively smooth. That is, the voltage of the voltage signal Sv is not sharply changed.

Next, the loop filter 21 averages the voltage signals Sv, and then outputs an averaged voltage signal Slv to the VCO 26.

On the basis of the averaged voltage signal Slv, the VCO 26 generates the standard reproduction clock signal Ss, and then outputs it to the phase comparator 19 for the sake of feedback, and further outputs to the reproducing circuit 29 and the spindle driver 27.

After that, the reproducing circuit 29 uses the standard reproduction clock signal Ss and the reproduction RF signal Srf, and then generates the above mentioned reproduction signal Spp.

On the other hand, the spindle driver 27 generates the above mentioned spindle control signal Sds in such a way that the frequency and the phase of the standard reproduction clock signal Ss respectively coincide with those of the above mentioned clock signal Sref.

As mentioned above, according to the information reproducing apparatus 100 of the embodiment of the present invention, when the damaged part exists in the reproduction RF signal Srf, the comparison signal Sfc or the focus error signal Sfe generated at the timing when the damaged part exists is replaced by the replacing signal, and then the replaced focus error signal Sfe or comparison signal Sfc is used to control the reproduction of the information recorded on the optical disk 5. Thus, even if the defect on the optical disk 5 causes the reproduction RF signal Srf, the focus error signal Sfe and the comparison signal Sfc to suffer the obstacles, it is possible to compensate the obstacles to exactly control the reproduction of the information recorded on the optical disk 5.

The repeat controller 10 or 18 and the damaged part compensating device 12 or 20 use the strong relation between the comparison signal Sfc and the focus error signal Sfe at the same rotational angle prior to the one rotation and the comparison signal Sfc and the focus error signal Sfe at the present rotational angle, and accordingly generate the respective replacing signals on the basis of the comparison signal Sfc or the focus error signal Sfe corresponding to the parts immediately before and after the damaged part, among the comparison signals Sfc or the focus error signals Sfe detected prior to the one rotation of the optical disk 5. Hence, it is possible to further exactly compensate the influence of the damaged part.

Moreover, the compensating operation in which the replacing signal respectively gradually connects the comparison signals Sfc or the focus error signals Sfe before and after the damaged part is carried out, which enables the comparison signal Sfc or the focus error signal Sfe corresponding to the timing of the damaged part to be compensated without the sharp difference in level. Hence, it is possible to prevent the focus servo control state or the wave form of the standard reproduction clock signal Ss from changing sharply.

In the above mentioned embodiment, the damaged part DP is detected by using the damaged part detecting device 9 to which the reproduction RF signal Srf is input. However, other than this manner, a configuration described below is possible. That is, the damaged period DP is detected by mounting a damaged part detecting device, which uses the fact that the wave deformation portion WC shown in FIG. 3 occurs in the focus error signal Sfe if the reproduction RF signal Srf has the damaged part DP and then detects the fact that the value of the focus error signal Sfe becomes equal to or greater than a predetermined threshold, on a route of the focus error signal Sfe between the frequency generator 28 and the switch 17.

Moreover, in the above mentioned embodiment, the case is described in which the present invention is applied to the focus servo circuit 110 and the PLL circuit 120 in the information reproducing apparatus 100. The present invention is not limited to this. For example, the present invention can be applied to the tracking servo control to the optical disk 5 (for example, the tracking servo control using a three-beam method, a push-pull method or a DPD (Differential Phase Detection) method).

In this case, as for the tracking error signal generated in the occurrence period of the damaged part, the above mentioned replacing signal is generated on the basis of the tracking error signals corresponding to the parts immediately before and after the damaged part among the tracking error signals detected prior to the one rotation of the optical disk 5 to thereby compensate the sharp change of the tracking error signal.

Furthermore, in the above mentioned embodiment, the case is described in which the present invention is applied to the focus servo control and the generation of the standard reproduction clock signal Ss performed by the PLL circuit 120 when the reproducing operation is carried out by the information reproducing apparatus 100. The present invention is not limited to this. For example, the present invention can be applied to an information recording apparatus which has a recording device for emitting a light beam onto an optical disk, while modulating the light beam according to the information to be recorded onto the optical disk, and which records the information while performing the focus servo control or the tracking servo control on an optical disk. Furthermore, the present invention can be applied to an information recording and reproducing apparatus which records and reproduces the information while performing the focus servo control or the tracking servo control.

In this case, the reproduction RF signal Srf is not generated when the information is recorded. Hence, it is necessary to detect, for example, a fact that any one of the tracking error signal and the focus error signal becomes equal to or greater than a predetermined threshold to accordingly detect a wave deformation in any one of the tracking error signal and the focus error signal to thereby extract the damaged part.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-330141 filed on Dec. 1, 1997 including the specification, claims, drawings and summary is incorporated herein by reference in its entirety.

What is claimed is:

1. A signal compensating apparatus for compensating a control signal which is generated on the basis of a light beam reflected by an optical recording medium, comprising:

a detecting device for detecting a damaged part of said control signal, which is caused by a defect of said optical recording medium or an obstruction existing on an optical path of said light beam or on said optical recording medium;

a replacing signal generating device for generating a replacing signal whose level gradually varies so as to connect a level of a first normal part of said control signal immediately before said damaged part with a level of a second normal part of said control signal immediately after said damage part; and a replacing device for replacing said damaged part by said replacing signal.

2. A signal compensating apparatus according to claim 1, wherein said replacing signal generating device comprises:

a recognizing device for recognizing said level of said first normal part and said level of said second normal part.

3. A signal compensating apparatus according to claim 1, wherein said replacing signal generating device comprises:

a recognizing device for recognizing said level of said first normal part and said level of said second normal part with respect to said control signal generated before said optical recording medium makes one rotation, more than one rotation, or one and more than one rotation.

4. A signal compensating apparatus according to claim 1, wherein said replacing signal generating device generates said replacing signal having a wave form in a shape of stairs.

5. A signal compensating apparatus for compensating a control signal which is generated on the basis of a light beam reflected by an optical recording medium, comprising:

a detecting device for detecting a damaged part of said control signal, which is caused by a defect of said optical recording medium or an obstruction existing on an optical path of said light beam or on said optical recording medium;

a replacing signal generating device for generating a replacing signal whose level gradually varies so as to connect a level of a first normal part of said control signal immediately before said damaged part with a level of a second normal part of said control signal immediately after said damage part; and a replacing device for replacing said damaged part by said replacing signal, wherein said replacing signal generating device comprises a recognizing device for recognizing said level of said first normal part and said level of said second normal part with respect to said control signal generated before said optical recording medium makes one rotation, more than one rotation, or one and more than one rotation, and wherein said recognizing device recognizes said level of said first part of said control signal generated at the same rotational angle of said optical recording medium as a first rotational angle of said optical recording medium immediately before said damaged part actually detected by said detecting device, and said level of said second part of said control signal generated at the same rotational angle of said optical recording medium as a second rotational angle of said optical recording medium immediately after said damaged part actually detected by said detecting device.

6. An information reproducing apparatus for reproducing information recorded on an optical recording medium by emitting a light beam onto said optical recording medium, comprising:

a reproduction signal generating device for generating a reproduction signal on the basis of said light beam reflected by said optical recording medium, said reproduction signal corresponding to said information recorded on said optical recording medium;

a reproducing device for reproducing said information recorded on said optical recording medium on the basis of said reproduction signal;

a control signal generating device for generating a control signal on the basis of said light beam reflected by said optical recording medium, said control signal being used to control a reproduction of said information recorded on said optical recording medium;

a detecting device for detecting a damaged part of said control signal, which is caused by a defect of said optical recording medium or an obstruction existing on an optical path of said light beam or on said optical recording medium;

a replacing signal generating device for generating a replacing signal whose level gradually varies so as to connect a level of a first normal part of said control signal immediately before said damaged part with a level of a second normal part of said control signal immediately after said damage part; and a replacing device for replacing said damaged part by said replacing signal.

7. An information reproducing apparatus according to claim 6, wherein said replacing signal generating device comprises:

a recognizing device for recognizing said level of said first normal part and said level of said second normal part.

8. An information reproducing apparatus according to claim 6, wherein said replacing signal generating device comprises:

a recognizing device for recognizing said level of said first normal part and said level of said second normal part with respect to said control signal generated before said optical recording medium makes one rotation, more than one rotation, or one and more than one rotation.

9. An information reproducing apparatus according to claim 6, wherein said replacing signal generating device generates said replacing signal having a wave form in a shape of stairs.

10. An information reproducing apparatus according to claim 6, wherein said detecting device recognizes said damaged part by detecting a decrease of a level of said reproduction signal.

11. An information reproducing apparatus according to claim 6, wherein said detecting device recognizes said damaged part by detecting a distortion of a wave form of said control signal.

12. An information reproducing apparatus according to claim 6, wherein said control signal is a focus error signal which includes information with respect to a relationship between a focal point of said light beam and a track of said optical recording medium.

13. An information reproducing apparatus according to claim 6, wherein said control signal is a tracking error signal which includes information with respect to a relationship between a spot position of said light beam and a track position of said optical recording medium.

14. An information reproducing apparatus according to claim 6, wherein said control signal is a standard reproduction clock signal which is used as a standard clock for reproducing said information recorded on said optical recording medium.

15. An information reproducing apparatus for reproducing information recorded on an optical recording medium by emitting a light beam onto said optical recording medium, comprising:

a reproduction signal generating device for generating a reproduction signal on the basis of said light beam reflected by said optical recording medium, said reproduction signal corresponding to said information recorded on said optical recording medium;

a reproducing device for reproducing said information recorded on said optical recording medium on the basis of said reproduction signal;

a control signal generating device for generating a control signal on the basis of said light beam reflected by said optical recording medium, said control signal being used to control a reproduction of said information recorded on said optical recording medium;

a detecting device for detecting a damaged part of said control signal, which is caused by a defect of said optical recording medium or an obstruction existing on an optical path of said light beam or on said optical recording medium;

a replacing signal generating device for generating a replacing signal whose level gradually varies so as to connect a level of a first normal part of said control signal immediately before said damaged part with a level of a second normal part of said control signal immediately after said damage part; and a replacing device for replacing said damaged parts by said replacing signal, wherein said replacing signal generating device comprises a recognizing device for recognizing said level of said first normal part and said level of said second normal part with respect to said control signal generated before said optical recording medium makes one rotation, more than one rotation, or one and more than one rotating, and wherein said recognizing device recognizes said level of said first part of said control signal generated at the same rotational angle of said optical recording medium as a first rotational angle of said optical recording medium immediately before said damaged part actually detected by said detecting device, and said level of said second part of said control signal generated at the same rotational angle of said optical recording medium as a second rotational angle of said optical recording medium immediately after said damaged part actually detected by said detecting device.

16. An information recording apparatus for recording information onto an optical recording medium by emitting a light beam onto said optical recording medium, comprising:

a recording device for emitting said light beam onto said optical recording medium, while modulating said light beam according to said information to be recorded onto said optical recording medium;

a control signal generating device for generating a control signal on the basis of said light beam reflected by said optical recording medium, said control signal being used to control a recording of said information onto said optical recording medium;

a detecting device for detecting a damaged part of said control signal, which is caused by a defect of said optical recording medium or an obstruction existing on an optical path of said light beam or on said optical recording medium;

a replacing signal generating device for generating a replacing signal whose level gradually varies so as to connect a level of a first normal part of said control signal immediately before said damaged part with a level of a second normal part of said control signal immediately after said damage part; and a replacing device for replacing said damaged part by said replacing signal.

* * * * *